United States Patent [19]

Grabbe et al.

[11] Patent Number: 5,693,528
[45] Date of Patent: Dec. 2, 1997

[54] COMPOSTING UNIT HAVING A VENTILATION SYSTEM FOR CLOSED ROTTING UNITS

[76] Inventors: Klaus Grabbe, Tiergarten 24, D-3300 Braunschweig; Lothar Schaar, Am Sudbach 34, D-3061 Heuerssen; Andreas Deutsch, Dresdener Ring 24, D-3320 Salzgitter, all of Germany

[21] Appl. No.: 331,663
[22] PCT Filed: May 10, 1993
[86] PCT No.: PCT/EP93/01142
§ 371 Date: Jan. 30, 1995
§ 102(e) Date: Jan. 30, 1995
[87] PCT Pub. No.: WO93/23350
PCT Pub. Date: Nov. 25, 1993

[30] Foreign Application Priority Data

May 9, 1992 [DE] Germany .................. 42 15 269.0

[51] Int. Cl.$^6$ ............................................. C05F 17/02
[52] U.S. Cl. ........................... 435/286.6; 435/290.1; 435/818; 71/9
[58] Field of Search ............ 435/290.1, 290.2, 435/290.3, 290.4, 286.6, 300.1, 818; 71/9; 34/507, 508, 565, 566, 218, 223, 224, 230, 232, 487, 488, 491, 492, 509, 510, 570, 718, 227

[56] References Cited

U.S. PATENT DOCUMENTS

| | | | |
|---|---|---|---|
| 4,233,266 | 11/1980 | Kummer | 435/290.1 |
| 5,116,761 | 5/1992 | Groenenboom | 435/290.1 |
| 5,129,935 | 7/1992 | Cerroni | 435/290.1 |

FOREIGN PATENT DOCUMENTS

| | | |
|---|---|---|
| 0 107 925 A1 | 5/1984 | European Pat. Off. . |
| 0 296 645 A1 | 12/1988 | European Pat. Off. . |
| 0 413 992 A2 | 2/1991 | European Pat. Off. . |
| 699030 | 2/1931 | France . |
| 40 08 104 | 9/1991 | Germany . |
| 40 21 868 | 11/1991 | Germany . |
| 40 21 865 | 1/1992 | Germany . |
| 40 34 400 | 4/1992 | Germany . |
| WO 92/0780 | 5/1992 | WIPO . |

*Primary Examiner*—William H. Beisner
*Attorney, Agent, or Firm*—Finnegan, Henderson, Farabow, Garrett, & Dunner, L.L.P.

[57] ABSTRACT

A composting unit is disclosed having a ventilation system for closed rotting units. A number of fans, passageways, and valves are designed and arranged in such a way that they ensure flow of conditioned circulating air, as desired, over and/or through and/or around a static or agitated stack of composting material.

21 Claims, 3 Drawing Sheets

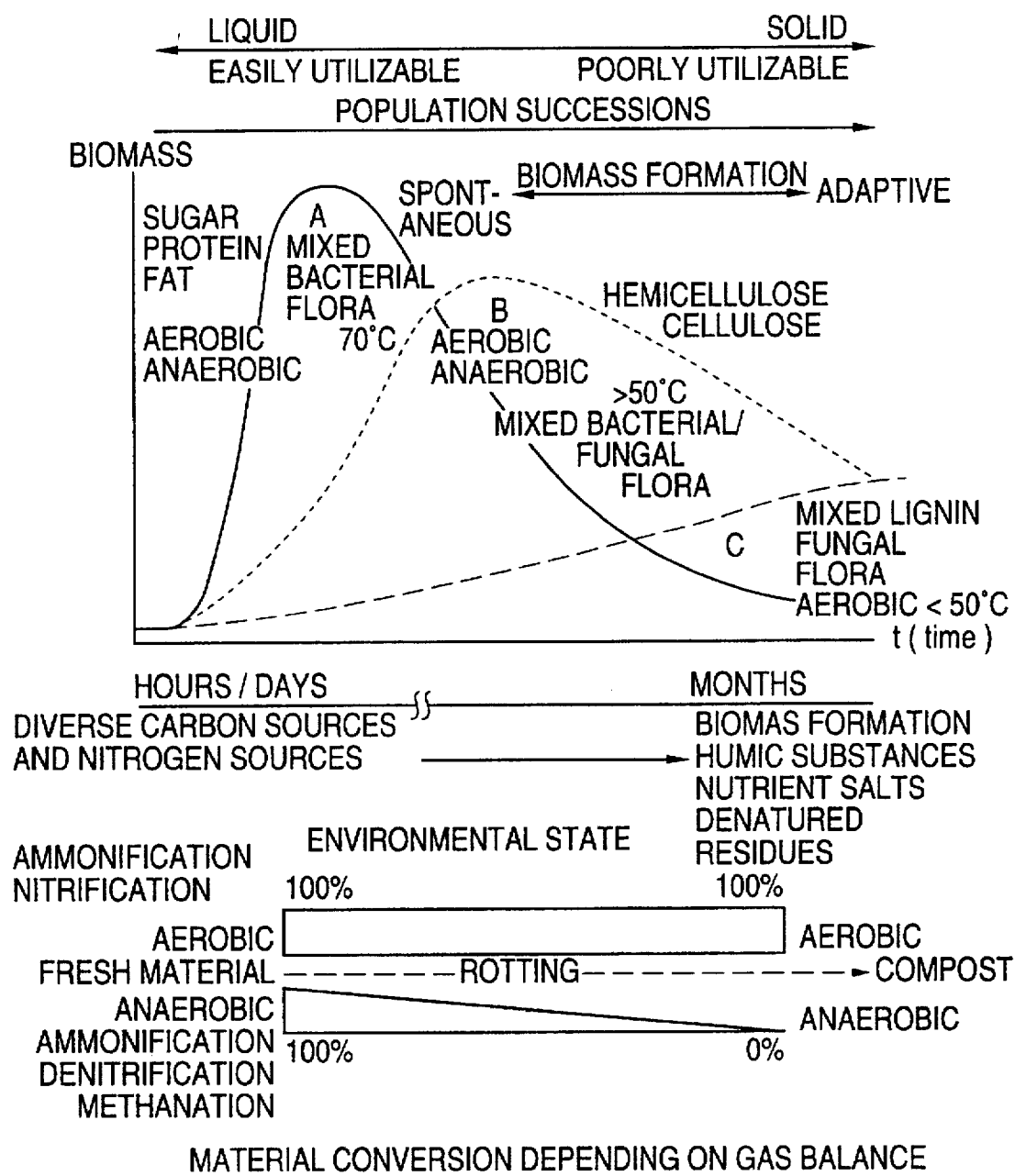

COMPOSTING UNIT HAVING A VENTILATION SYSTEM FOR CLOSED ROTTING UNITS

BACKGROUND OF THE INVENTION

1. Field of the Invention

The invention relates to a composting unit having a ventilation system for closed rotting units for composting biogenic organic residues which permits a variable configuration of the flow parameters and flow guidance in order, as a result, to tailor the climate and ambient conditions in the stack or in the rot to the requirements of the microbial metabolism during the composting process.

2. Description of the Related Art

In the rotting of biogenic organic material mixtures under aerobic conditions, heat and metabolic gases are formed which must be lead off via ventilation systems. In the prior art, fresh air flows through the rotting mixture and the corresponding exhaust air is blown off. This method does not permit a defined influence to be brought to bear on the rotting processes, since oxygen is supplied in an uncontrolled manner with the fresh air supply and moisture and heat are discharged with the exhaust air. Gas gradients, moisture gradients and/or temperature gradients form, which, because of the interlinked parameters, are only suitable for describing the process.

Conventional ventilation systems have the disadvantage that important process aims are not achieved. Thus, discharge of water is desired, but at the same time heat is also removed with this in an uncontrolled way so that, on the one hand, desired moisture contents cannot be maintained and, on the other hand, important temperature prerequirements for the development of mesophilic and thermophilic microflora cannot be aimed at. Moreover, influencing the microbial metabolism by means of defined oxygen input must be dispensed with. The defects of the present process conduction are shown in the development of excessive temperature levels, the progressive dry stabilization of the material to be rotted and an unsatisfactory mass throughput. In addition, there is the discharge of odor substances and production of condensate which make additional treatment devices necessary. Known disadvantages for the product compost are derived therefrom, that is the unsatisfactory utilization of the growth potential of specific microflora, the poor reproducibility inevitably arising of the sought-after quality grades in the sense of quality directives for composts and hazardous formation of niches for harmful flora in composts and secondary products thereof. The risk of possible harmful effects in the diversified use cannot be calculated and is unreasonable against the background of product liability.

The composting unit mentioned at the outset is disclosed by DE-40 34 400 A1 and the corresponding WO 92 07807—GRABBE. To avoid repetitions, reference is expressly made herewith to this document. It describes a process for the biotechnological treatment of a residue mixture, preferably in the form of a stack, by a microbial conversion process in a closed system which is suitable, in particular, for the production of compost. Physical, chemical and biological process parameters are incorporated in the process management and are mutually tailored, for the purpose of optimizing the sanitation, odor destruction and stable humus formation of the residue mixture, to the microbial metabolism particularly required for this. For this purpose, the residue mixture is subjected to two different types of ventilation or a combination formed between these two types of ventilation. In the one type of ventilation, air is passed through the residue mixture. In contrast, in the second type of ventilation, the air is passed along above the residue mixture. The two types of ventilation, to build up desired temperature conditions, moisture conditions and/or oxygen/carbon dioxide ratios, in particular profiles, in the residue mixture, are matched to each other in such a way that variable mixing ratios between 0 and 100% can be formed from the circulating volumetric flow of air. The ventilation means are each blowers or fans, one blower conducting the air along above the residue mixture and a second blower blowing the air through the residue mixture.

The process described in the abovementioned literature generally operates successfully. However, problems can occur if the density of the rotting mixture prevents flow-through. In the limiting case of air-impermeability of the rotting mixture, the fan provided for the flow-through only builds up a static pressure below the stack without air being made to flow, even when both fans are running, ie. the fan provided for flow over the stack reinforces the fan provided for flow through the stack to the extent that the air sweeping along over the stack exerts a certain suction on the stack. Although both fans are running, only the flow over the stack effects a certain circulation of air in the system.

DE-40 21 868 A1—HERHOF—describes a process for composting waste. The material to be rotted is introduced into a closed vessel and microbially degraded with supply of air. In order to be able to start the composting rapidly and reliably in the initial phase, the exhaust air exiting the material to be rotted is fed back again to the material to be rotted during the initial phase. This circulated air phase is given up when the oxygen content undershoots 18%. The air circulation system serves for preserving the biogenic heat formation, especially in winter.

DE-40 21 865 A1—HERHOF—likewise describes a process and an apparatus for composting wastes having circulated air management which serves for sanitation over a period of 5 days. The circulated air management is started after the degradation of the more readily degradable constituents. The reason for this is the fact that the biogenic heat formation cannot be mastered in the stormy initial phase of material treatment with the system depicted if the control system described is used for the gas budget. For cooling, only the fresh air supply remains as part of an undefined parameter linkage.

Finally, DE-40 08 104 A1—WIENECKE—describes a composting system which is suitable only for small containers, since only convection is used for aeration. Guidance of the microbial metabolism is not possible.

SUMMARY OF THE INVENTION

The aim of the invention is to overcome at least partially the disadvantages of the said prior art.

It achieves this aim by the subject-matter of patent claim 1, that is by a composting unit having a ventilation system for closed rotting units having first means which are designed and arranged in such a way that they ensure flow of conditioned circulating air, as desired, over and/or through and/or around a static or agitated stack of a material mixture. As a result, an extremely flexible control system is provided, with the aid of which the highly variable biological activity of residue mixtures becomes controllable. Defined ambient conditions in the material to be rotted are produced by the air circulation system which transmits a predetermined climate to the more solid material mixture. According to the invention, this occurs by changing the flow parameters and flow management, that is, as desired, flow over and/or through and/or around the stack.

The composting unit according to the invention permits the stack of a material mixture to be exposed to different flow variants as desired, for example a flow variant in which only flow over the stack takes place, that is simultaneous flow through and around the stack is prevented. According to another variant, flow solely through the stack can be set, ie. flow over it and around it can be prevented. Finally, the composting unit according to the invention permits flow solely around the stack to be set, that is to prevent simultaneous flow over it and through it. Obviously, some or all three of these flow variants can be used at the same time.

The first means for setting the flow variants as desired preferably have valves for defined setting of the air pathways. The valves here are preferably constructed as controllable servo-valves.

Furthermore, the first means for setting the flow variants as desired have at least two fans which can likewise be activated for the defined setting of the flow parameters and, as desired, can be connected in parallel or in series.

According to a further preferred embodiment, an additional fan is provided which is connected in series to and downstream of the two abovementioned fans, more precisely downstream of the stack in the direction of flow.

All fans are preferably controllable with respect to their output characteristics.

According to a further embodiment, the air circulation system has second means for manual or automatic feed of variable quantities of fresh air. Third means for the passive or fan-reinforced blowing out of an exhaust air quantity corresponding to the quantity of fresh air supplied are preferably provided. Fourth means preferably serve for the central and/or partial heating/cooling and moistening of the circulated air. Finally, fifth means preferably serve for controlling the gas composition in the circulated air.

By manual or programmed presetting and/or computer-assisted alteration of variable flow guidance and flow parameters it is possible to suppress undesired heat formation and heat accumulations and/or to remove excess heat from the system without lasting changes having to be made in other process-relevant parameters. The process parameters can therefore be influenced independently of each other. From this there arise advantages which can be described as follows:

The temperature plateaus for general and specific metabolic performances of the microflora participating in the composting process can be selected specifically (cf. FIG. 1, A, B, C). Sanitation can be optimally achieved thermally and biochemically at temperatures <60° C. Odor substances are repeatedly recycled through the material to be rotted and are degraded in the course of this. The mass conversion rate is optimized via preset temperature profiles in such a way that relatively short residence times make the operation of closed rotting units more economic. The feed of oxygen can be controlled in such a way that all states between strictly anaerobic and strictly aerobic can be produced via the gas phase in the air circulation system.

The invention is described in more detail below on the basis of exemplary embodiments and the accompanying highly diagrammatic drawing.

BRIEF DESCRIPTION OF THE DRAWINGS

FIG. 1 is a graph illustrating mass conversion dynamics during composting;

DESCRIPTION OF THE PREFERRED EMBODIMENTS

FIG. 1 shows biomass formation and mass conversion in relation to time and the respective microflora as a dynamic process during composting.

The invention is now geared to giving the respective desired microflora a selectional advantage by providing the parameters such as temperature, moisture, gas composition which are optimal for this flora.

FIG. 2 shows the various ventilation variants, that is to say:

Flow over the stack (FIG. 2—No. 1))

For the purpose of the flow over the stack, the air is conducted over the stack 10. In this case, only one fan runs, that is fan V2 (see also FIG. 3). The servo-valves R1, R2, R3 and R6 (see FIG. 3) are closed during this; in contrast, the servo-valves R4, R5 and R7 are open. The servo-valves R8 and R9 are activated in dependence on fresh air requirement. During flow over the stack, the air sweeps solely over the free surface of the stack 10. This variant very gently removes heat and exhaust gases. Moreover, it leads to a slight suction of the gases from the stack 10 into the air flowing over.

Flow over and flow through the stack (FIG. 2—No. 2.))

Figure 2A:
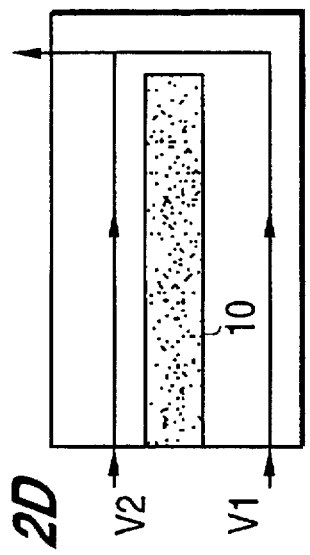
FIG. 2 shows flow variants achievable with an exemplary embodiment of the present invention.
Figure 2B:
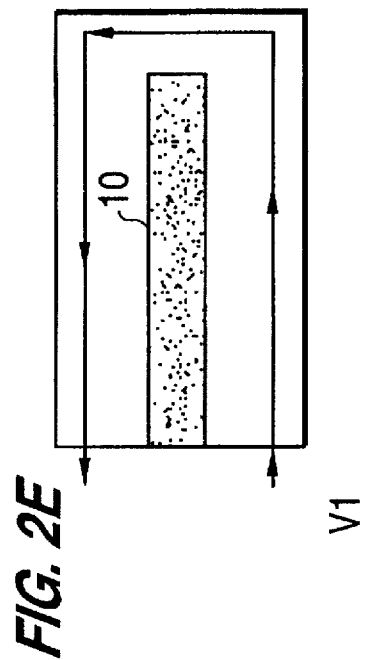
Figure 2C:
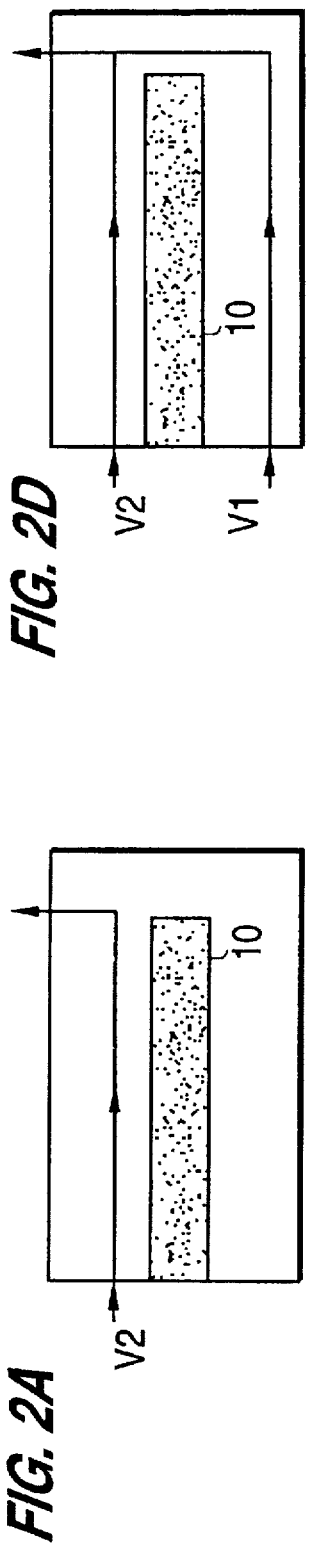
Figure 2D:
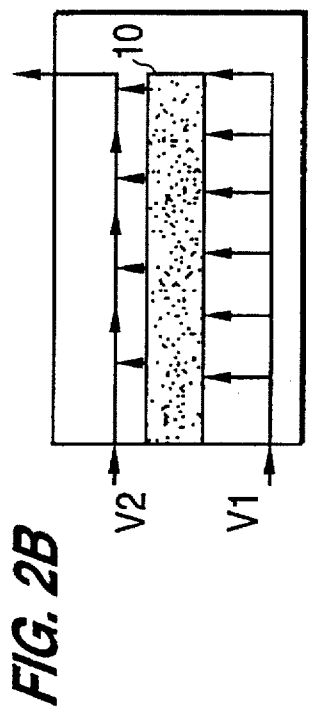
Figure 2E:
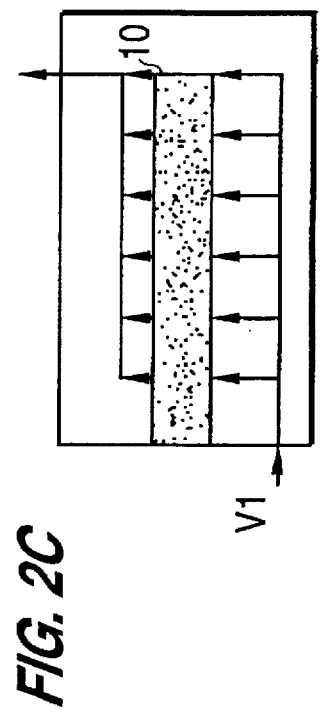
Figure 3:
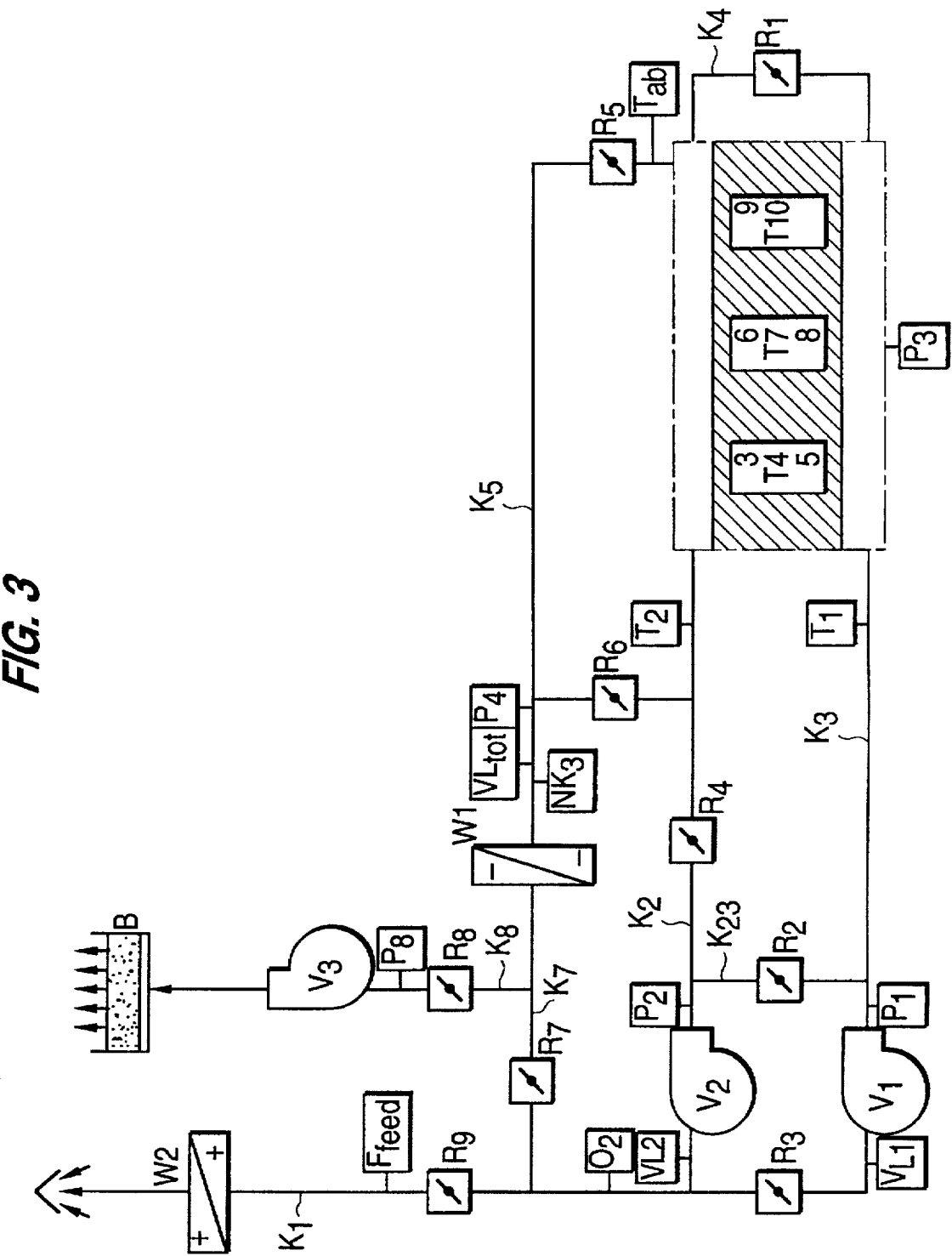
FIG. 3 shows a control diagram of a variable air circulation system in accordance with an exemplary embodiment of the present invention.

In order to combine flow over the stack with a flow through it, a further fan, that is fan V1, is switched on and the servo-valve R3 is opened (cf. FIG. 3). All other valve positions are unaffected by this. The advantages of this flow variant are described extensively in DE 40 34 400 A1 and in WO 92/07807—GRABBE corresponding to this. To avoid repetitions, express reference is made to the contents of the said document.

Flow through the stack (FIG. 2—No. 3.))

In the case of flow through the stack, the fan 2 is turned off and the servo-valve R4 is closed. All other valve positions are unaffected by this (FIG. 3). However, for reinforcement, the fan V2 (for example to be less powerful) is switched on in series and the servo-valve R2 is opened.

Flow over and under the stack (FIG. 2—No. 4))

In the case of flow over and under the stack, both fans V1+V2 again operate in parallel, the servo-valves R3, R4 and R1 are open; the servo-valve R2 is closed. The position of the other servo-valves is unaffected (FIG. 3). In this flow variant, the stack 10 is exposed on both sides (top and bottom) to the same effect, as in the variant according to No. 1.), ie. pure flow over the stack acting only on one side.

Flow around the stack (FIG. 2—No. 5.))

In the case of flow around the stack, only fan V1 runs and the servo-valves R1, R6, R7 and R3 are open; the servo-valves R2, R4 and R5, in contrast, are closed (FIG. 3).

If required, the servo-valve R2 can be opened and then serves for the addition of transported air quantities in the various ventilation variants.

FIG. 3 shows the flow diagram of an exemplary embodiment of the invention. According to this, circulated air can be conducted via a heat exchanger W1 when servo-valve R5 is open. The heat recovery in the heat exchanger W1 is preferably used to control via a heat exchanger W2 the temperature of fresh air which flows in via a duct K1. The air discharge corresponding to the fresh air intake via a servo-valve R9 is performed with servo-valve R8 open via a fan V3 connected to the two fans V1 and V2. The air blown out is conducted in this case via a biofilter B. In the duct K1 a temperature sensor $T_{feed}$ is assigned downstream of the heat exchanger W2, which temperature sensor measures the temperature of the fed air. The output data of the temperature sensor are fed to a process computer (not shown) for electronic control of the composting process.

Beneath the servo-valve R9 there is arranged in the duct K1 a sensor $O_2$ for determining the $O_2$ content. Its output values are also fed to the process computer. The duct K1 branches into a duct K2 in which is arranged the fan V2. Upstream of the fan V2 is arranged a sensor VL2 which measures the air volume. Its output value is in turn fed to the process computer. Downstream of the fan V2 there is connected a further sensor P2 which measures the flow pressure. The duct K2 opens out into the space above the stack 10. The duct contains, downstream of the fan V2, a servo-valve R4 which can be activated by the process computer. The fan V2 can also be activated by the process computer. Immediately upstream of the junction of the duct K2 in the space above the stack 10 there is arranged a further temperature sensor T2, the output signal of which in turn is fed to the process computer.

The space above the stack 10 opens out into the duct K5 which is fitted with a temperature sensor Tab. Its measurements in turn are fed to the process computer. The open flow cross section of the duct K5 is controlled by the servo-valve R5. The duct K5 is finally admitted via the heat exchanger W1 to a branch point from which the ducts K7 and K8 depart. The duct K7 is lead back to duct 1 via a servo-valve R7 which can be activated by the process computer. The open flow cross section of duct K8 is adjusted by a further servo-valve R8. Downstream of the servo-valve is a pressure sensor P8, downstream of which is connected the fan V3. The fan V3 blows the exhaust air into the open via the biofilter B.

Immediately upstream of the heat exchanger W1 are arranged a further pressure sensor P4, an air flow meter $VL_{tot}$ and an $NH_3$ sensor. The output values of these sensors are likewise fed to the process computer.

Upstream of the latter sensors, a duct K6 branches off from the duct K5, which duct K6 is connected to the duct K2 already mentioned via a servo-valve R6.

The duct K1, in addition to its branch line leading to the fan 2 is continued on, that is to the fan V1. Between the fans V2 and V1 is situated in the duct K1 a servo-valve R3, in turn controllable by the process computer. Immediately upstream of the fan V1, an air volume sensor VL1 measures the volume of air flowing to the fan V1. The fan V1 blows air via the duct K3 into a space beneath the stack 10. Downstream of the fan V1 is in turn connected a pressure sensor P1, more precisely upstream of a branch line K23 which connects the duct K2 to the duct K3 via a servo-valve R2. Immediately upstream of the junction of the duct K3 into the space beneath the stack 10 is further arranged a temperature sensor T1.

A pressure sensor P3 measures the pressure in the space beneath the stack 10. The spaces beneath and above the stack 10 are connected together via a duct K4. The servo-valve R1 controls the open flow cross section in the duct K4.

Finally, a plurality of temperature sensors T3 to T10 are further arranged in the stack.

The servo-valve R1, in interaction with the other servo-valves, makes possible the flow variants depicted in FIG. 2. In the exemplary embodiment depicted, the servo-valves are controlled by the process computer and the output data of all measuring instruments are fed to the process computer. The outputs of the 3 fans V1, V2 and V3 are likewise controlled by the process computer.

The exemplary embodiment depicted illustrates the tremendous versatility of the flow variants attainable therewith with the aid of only two fans and the said servo-valves. Only the variety of the flow variants makes possible accurate and sensitive tailoring of the process parameters to the particular microbial material conversion desired, ie. matching the process parameters to the particular microflora desired. Only by this means can the material conversion be influenced in a biologically effective manner.

Overall, an air circulation conduction system is described for closed rotting systems in which the flow parameters and the flow conduction are adaptable in a sensitive manner for the purpose of a defined biochemical process management. By means of this adaptation, the process management can be variably configured. The flow can pass over, through and around static or agitated stacks. All combinations of these flow variants are possible. Overall, it is possible, via the maintenance of desired climatic and environmental conditions, to select and control sensitively the microbial material conversion.

In order to be able to combine the output of the two fans V1, V2, linking the flow under the stack to flow over the stack via the duct K4 having a built-in servo-valve R1 is a solution to the problem which has considerable advantages in comparison with the prior art. It serves the flow variants depicted with reference to FIG. 2.

In contrast, the GRABBE document mentioned at the outset describes a relatively simple duct outfit with restriction of the air conduction variants. Only the duct interlinking together with the corresponding servo-valves makes possible the interlinking of the fan outputs. Here also, the servo-valve R1 which can be continuously trimmed manually or in a computer-assisted manner is of great importance. As a result, fine adjustments in the conduction of the bioprocess are possible in a previously unknown quality.

We claim:

1. A composting unit, comprising:

a compartment for holding a stack of compost material;

a plurality of gas passageways associated with the compartment, the gas passageways being configured for directing gas along a first route over the stack, a second route through the stack, and a third route around the stack; and a plurality of passageway regulators associated with said plurality of passageways and configured to be selectively adjustable between a first mode encouraging gas flow along the first route and deterring gas flow along the second and third routes, a second mode encouraging gas flow along the second route and deterring gas flow along the first and third routes, and a third mode encouraging gas flow along the third route and deterring gas flow along the first and second routes.

2. The composting unit of claim 1, wherein the plurality of passageway regulators are configured to be selectively adjustable to be in more than one of the first, second, and third modes at a time.

3. A composting unit as set forth in claim 1, wherein the plurality of passageway regulators are also configured to be selectively adjustable to a fourth mode encouraging gas flow over and under the stack and deterring gas flow through the stack.

4. The composting unit of claim 3, wherein the plurality of passageway regulators are configured to be selectively adjustable to be in more than one of the first, second, third, and fourth modes at a time.

5. The composting unit of claim 3, wherein the plurality of passageway regulators are configured to be selectively adjustable to a fifth mode encouraging gas flow over and through the stack and deterring gas flow around the stack.

6. The composting unit of claim 5, wherein the plurality of passageway regulators are configured to be selectively adjustable to be in more than one of the first, second, third, fourth, and fifth modes at a time.

7. The composting unit of claim 1, further including a device within the compartment for agitating the stack.

8. The composting unit of claim 1, wherein the composting unit further includes at least one fan flow connected to at least a portion of the plurality of gas passageways.

9. The composting unit of claim 8, wherein said at least one fan includes at least two fans, each fan having an adjustable output.

10. The composting unit of claim 9, wherein said at least two fans includes two fans flow connected in parallel on a gas inlet side of the compartment.

11. The composting unit of claim 10, further including a switchover device for switching the parallel fan connection to a series fan connection so that output from both of said two fans flow through a single duct connected to the gas inlet side of the compartment.

12. The composting unit of claim 8, further including means for controlling output of at least one fan.

13. The composting unit of claim 8, wherein said at least one fan includes three fans, two of which are flow connected to a gas inlet side of the compartment, and one of which is flow connected to a gas outlet side of the compartment.

14. The composting unit of claim 1, wherein the regulators include valves for selectively directing at least air flow through said passageways.

15. The composting unit of claim 14, further including means for controlling the valves.

16. The composting unit of claim 1, further including means for variably introducing fresh air into the compartment.

17. The composting unit of claim 16, further including means for variably exhausting gas quantities corresponding to quantities of variably introduced fresh air.

18. The composting unit of claim 1, further including means for varying temperature and moisture of gas flow.

19. The composting unit of claim 1, further including means for controlling gas composition in the gas flow.

20. The composting unit of claim 19, wherein the gas flow includes air.

21. A composting unit, comprising:

a compartment configured to hold a stack of composting material;

a first gas pathway flow connected to said compartment and extending along at least a portion of a bottom of the compartment beneath the stack, thereby enabling the first gas pathway to be in flow communication with the stack, the first gas pathway having an inlet side and an outlet side in the compartment;

a second gas pathway flow connected to said compartment and extending along at least a portion of a top of the compartment above the stack, thereby enabling the second gas pathway to be in flow communication with the stack, the second gas pathway having an inlet side and an outlet side in the compartment;

at least one inlet side valve for selectively regulating gas flow to the inlet side of at least one of the first gas flow path and the second gas flow path;

at least one outlet side valve for selectively regulating gas flow from the outlet side of at least one of the first gas flow path and the second gas flow path;

a first fan flow connected through a first conduit to the inlet side of the first pathway; and a second fan flow connected through a second conduit to the inlet side of the second pathway wherein said at least one inlet side valve includes a valve for selectively deterring flow through said first conduit, and wherein said at least one outlet side valve includes a valve located in a conduit flow connecting the outlet side of the first pathway to the outlet side of the second pathway.

* * * * *